United States Patent [19]

Bross

[11] 4,185,734
[45] Jan. 29, 1980

[54] ARTICLE COUNTING MACHINE

[75] Inventor: Charles F. Bross, Chicago, Ill.

[73] Assignee: Pennwalt Corporation, Philadelphia, Pa.

[21] Appl. No.: 897,234

[22] Filed: Apr. 17, 1978

[51] Int. Cl.$^2$ .............................................. B65G 47/34
[52] U.S. Cl. ................................. 198/484; 198/503; 198/635; 198/840
[58] Field of Search ............. 198/482, 484, 503, 635, 198/646, 655, 393, 397, 840; 53/501

[56] References Cited

U.S. PATENT DOCUMENTS

| 1,703,073 | 2/1929 | Black | 198/840 |
|---|---|---|---|
| 2,668,613 | 2/1954 | Ashlock | 198/397 |
| 3,139,713 | 7/1964 | Merrill et al. | 53/501 |
| 3,307,704 | 3/1967 | Pashaian et al. | 198/840 |

*Primary Examiner*—Joseph E. Valenza

[57] ABSTRACT

An improved slat-type counting machine which prevents continuous miscounting of discrete articles, such as tablets, capsules, and the like, is disclosed. The slats are provided with conventional cavities, each of which carry a tablet or capsule therein to be counted. Each cavity is provided with a slit therethrough which slit penetrates the bottom of the cavity and partially into its supporting slat. The stationary ejector blade mechanism of the present invention is mounted to the counting machine. As the slats travel in a closed loop path, each slit is penetrated by a blade, the tip thereof entering the slit at a point beyond the bottom of the cavity to thereby eject any tablet wedged in the cavity, which tablets failed to discharge by force of gravity at a predetermined discharge station area. Means are also disclosed for adjusting and aligning the ejector blade mechanism with respect to the slit cavities disposed in the moving slats.

7 Claims, 9 Drawing Figures

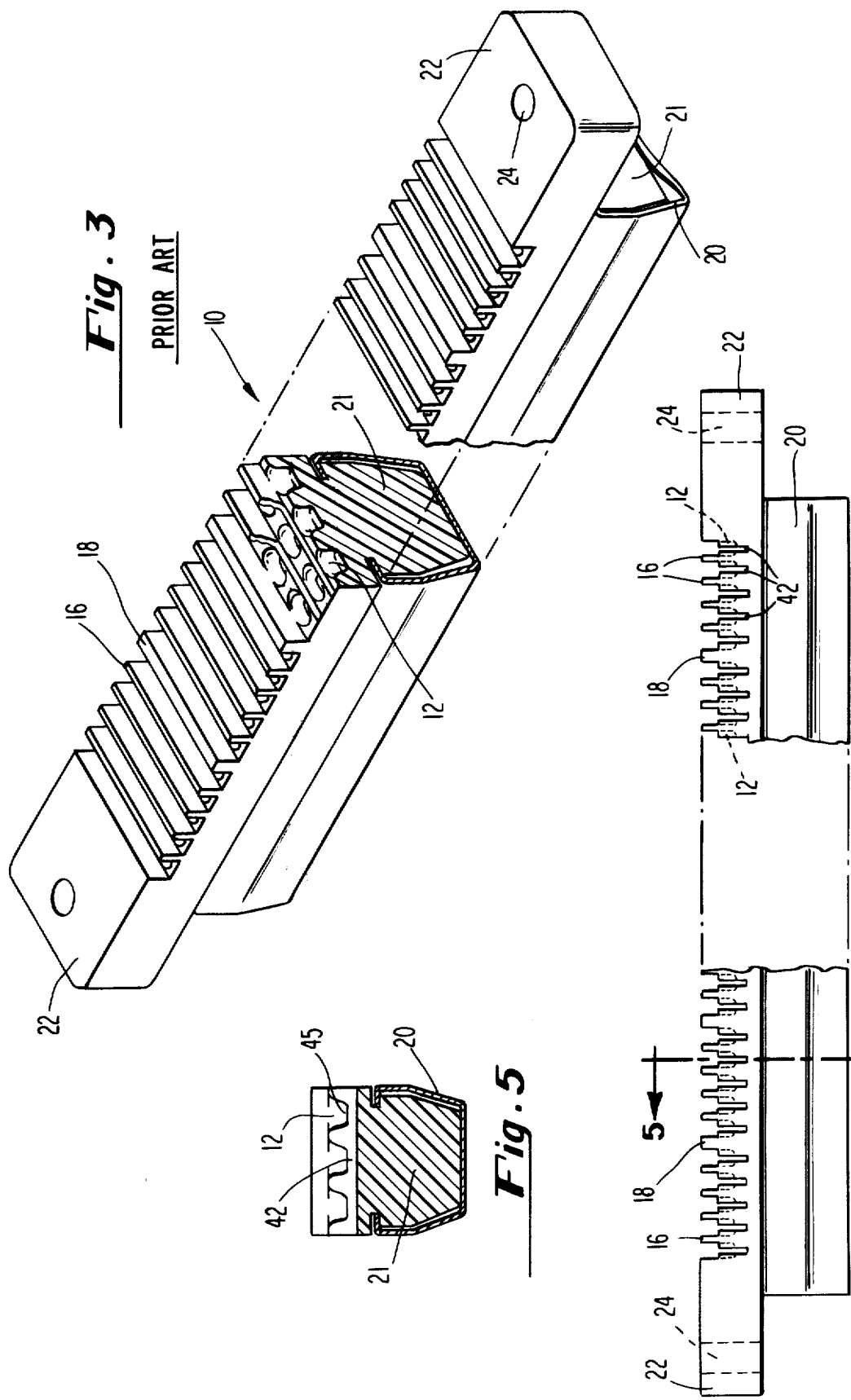

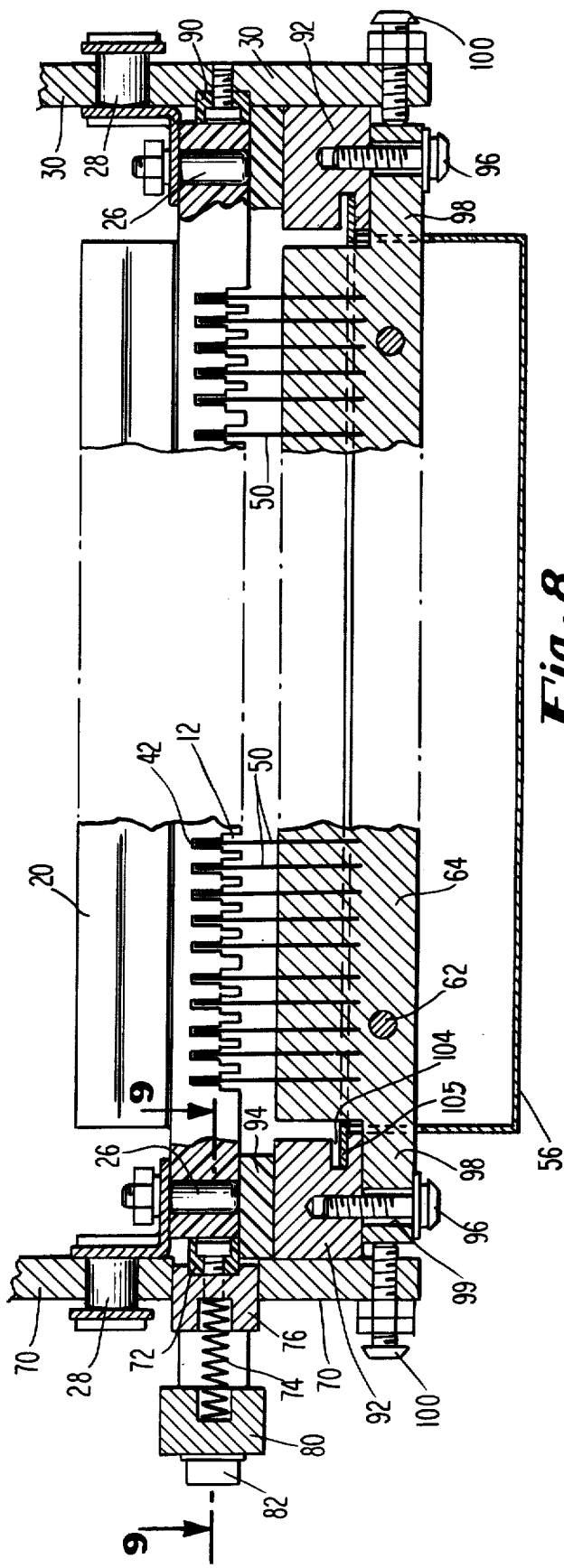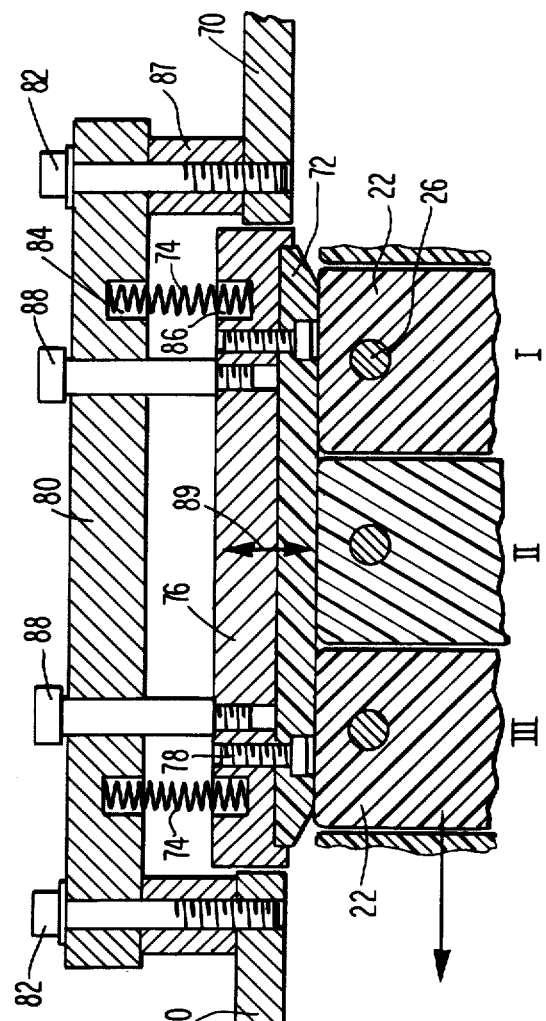

ARTICLE COUNTING MACHINE

STATEMENT OF THE INVENTION

This invention relates to slat-type counting machines particularly adapted for small discrete articles and provides improved ejector means for insuring an absence of any continuous miscount of the articles.

BACKGROUND OF THE INVENTION

Recent popularity of elongated-uncoated tablets has presented manufacturers of tablet counting machines with vexing problems. These tablets often became wedged in slat cavities and would not drop, by force of gravity, or otherwise be discharged into containers, resulting in short counts. If the wedging of a tablet within a slat cavity is permitted to remain, the miscount is aggravated each time that slat passes the discharge station. Such wedged tablets are not readily detected by an operator working at the front of the counting machine since the slat cavities carrying the wedged tablets are not visible until they have already been recharged from a hopper.

In attempting to solve the wedging problem, not only with elongated-uncoated tablets, but any tablets, pills, bolus, or articles which may have become wedged or stuck in slat cavities, several manufacturers employ pins which are inserted into, or through the slat cavity, and then withdrawn, for removing or ejecting the stuck or wedged article. Cam or eccentric means are required to coordinate pin movement with the moving slat cavities. Many moving parts are needed which require rather precise adjustment and/or alignment if costly damage to the machine is to be avoided.

The present invention provides structure for ejecting wedged articles from slat cavities by means of spaced stationary blades which register with a pre-cut slit provided through each cavity, the blades being positioned either at the discharge station, in which case the ejected article may be counted; or at a slat return area, in which case the ejected article merely falls into an isolated container suitably placed.

BRIEF SUMMARY OF THE INVENTION

The present invention briefly described consists of a machine comprising a conveyor which carries elongated slats having uniformly spaced cavities provided therein for receiving tablets, capsules, etc. to be counted; slits pre-cut through each of the cavities; means moving the slats in a closed loop path; and a plurality of spaced apart stationary blades so positioned that the blades enter the pre-cut slits of the cavities as the slats move past the blades to thereby eject the capsules or tablets stuck or wedged in the cavities.

The invention may be used advantageously, or adapted for use with the pill counting and filling mechanism shown and described in U.S. Pat. No. 3,139,713, assigned to the assignee hereof.

As described in the patent, the capsules are fed into capsule receiving slats which are carried on an endless conveyor traveling transversely to the direction of slat elongation. The ejector mechanism of the present invention may be mounted in cooperating relationship to the moving slats at the capsule discharge station, or at a suitable slat return location, as aforementioned.

The slats are of such length that capsules contained within their cavities can be divided in a fashion that each slat delivers the same number of capsules to a manifold or chute. The given number of filled slats will thus fill each bottle or container with a desired number of capsules.

BRIEF DESCRIPTION OF THE DRAWINGS

FIG. 3 is a perspective view of a prior art slat member usable in the machine of FIG. 1.

FIG. 4 is a side view of the slat member of FIG. 3 modified in accordance with the present invention.

FIG. 5 is an elevational view, in section, of the modified slat of FIG. 4 taken along line 5—5 thereof.

FIG. 8 is a partially sectioned view, of the mechanism shown in FIG. 7 taken substantially along line 8—8 thereof.

FIG. 9 is a sectional view of a portion of the alignment mechanism of FIG. 8 taken substantially along line 9—9 thereof.

DETAILED DESCRIPTION OF THE INVENTION

Figure 1:
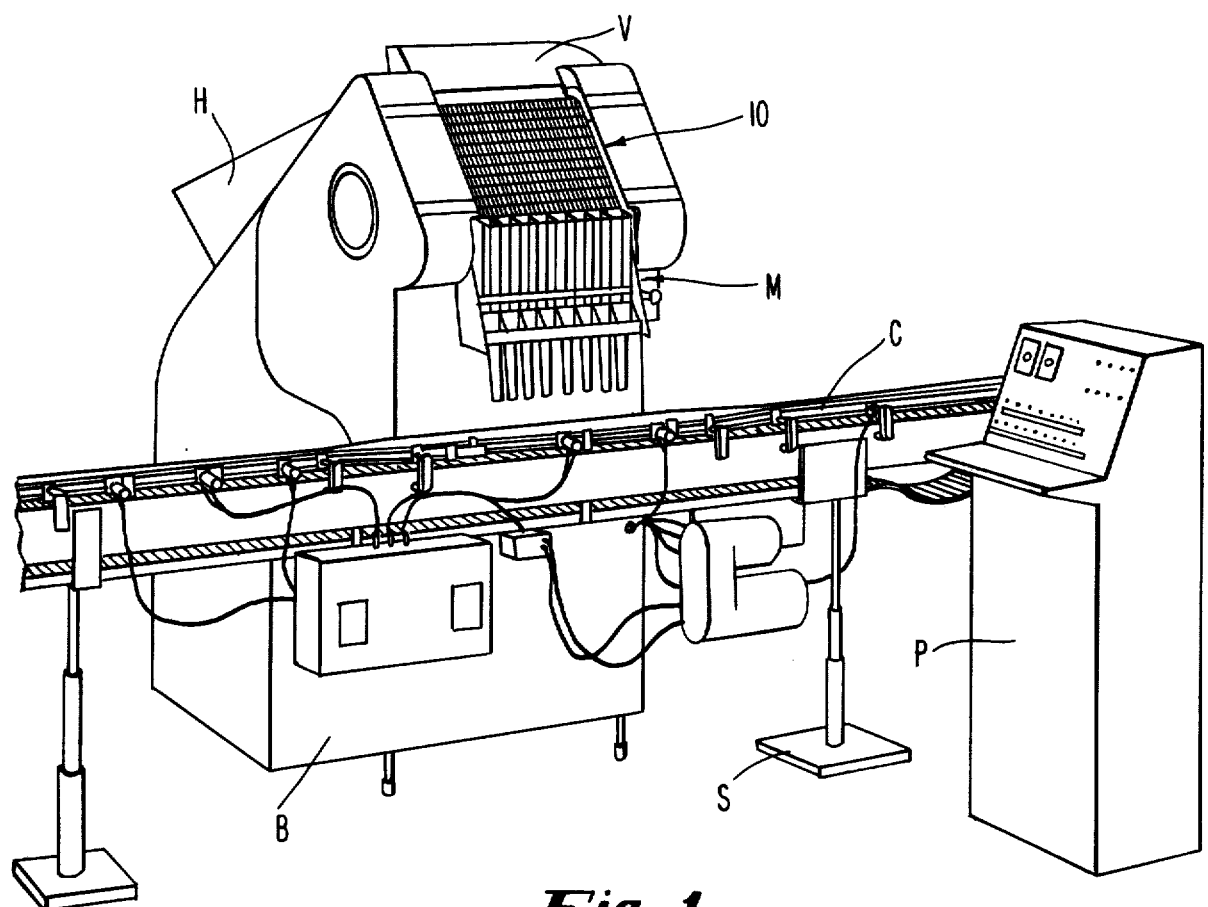
FIG. 1 is a perspective view of a slat-type counting machine with which the present ejector mechanism may be employed.
Figure 2:
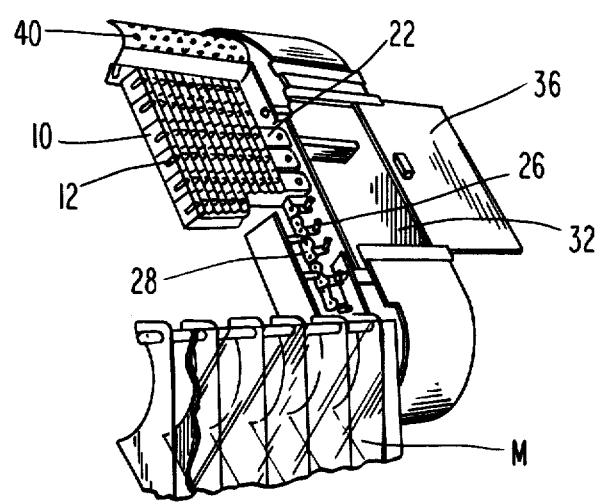
FIG. 2 is a fragmentary perspective view of suitable slat-conveying mechanism employed in the machine of FIG. 1.

Referring now to the drawings, and more particularly to FIGS. 1, 2 and 3 thereof, elongated slats 10, having a multiplicity of cavities 12 spaced therein, are caused to travel below feed hopper H to receive the articles to be counted, such as capsules, tablets, pills, bolus, and the like. Each tablet or capsule, for example, finds an empty cavity, and is then transported upwardly at a moderately inclined angle before proceeding downwardly through an inspection area, which area coincides generally with the area represented by slats 10 in FIG. 1. The articles are then discharged into a manifold system M before being emptied, by force of gravity, into bottles or containers transported by a conveyor system C, preferably in a continuous-fill-operation during which operation the bottles or containers receive the counted tablets.

Base cabinet B, support members S, console control panel P, and other components associated with the machine are illustrated to place them in perspective and to facilitate a clearer understanding of the present invention.

Cavities 12 may be precision-milled within slats 10 in order to accommodate specific sizes and shapes of any article to be counted. The slat shown in FIG. 3 comprises three rows of cavities. Each slat 10 is provided with partitions 16 for transversely separating the cavities. Each fifth partition 18 is slightly wider than the preceding four. Thus, 15 capsules, or multiples thereof, from each like slat, will be discharged into a preselected chute or manifold. The slats may be provided with a single row of cavities, as illustrated in FIG. 2, or with any convenient number, and may, or may not require the presence of wider partitions 18. The slat shown in FIG. 3 is intended to merely illustrate a suitable slat for use with the present invention.

A cradle 20, of steel, for example, embraces the lower portion 21 of each slat 10 and provides rigidity thereto. Slats 10 have end portions 22, each having an aperture 24 therethrough for receiving a lug pin 26 (FIG. 2) of an endless conveyor chain 28 supported on a right chain guide 30 (FIG. 8) which is rigidly attached to right side plate 32 (FIG. 2) of the counting machine. An identical chain and chain guide system is provided on the left side of the machine.

A sliding panel 36 permits easy access within the counting machine. Brush 40, downstream from hopper H, rotates in a direction opposing the general direction of travel of the slats. Brush 40 urges the tablets or capsules which have not found a cavity 12 back towards the fill area for deposition into an oncoming empty cavity.

Brush 40 also assists in the removal of dust particles, and the like, into a suitable suction device V.

In accordance with an important feature of the invention, slats 10 are modified as shown in FIGS. 4 and 5. Each cavity 12 is provided with a slit 42 therethrough which penetrates the bottom 44 of the cavity as well as an upper portion 45 of the slat where the cavities are disposed. It is essential that slits 42 extend beyond cavity bottoms 44 in order that the tips of the stationary blade ejectors, later described, ride along the deepest portion of the moving slits, or in very close proximity to the deepest portion, to thereby eject a wedged article in lieu of crushing it. It has been found that crushing frequently occurs if the slit depth is only made coextensive with bottom 44 of cavity 12. Slits 42 are aligned with the direction of travel of the slats and are formed therein by means well known.

Figure 6:
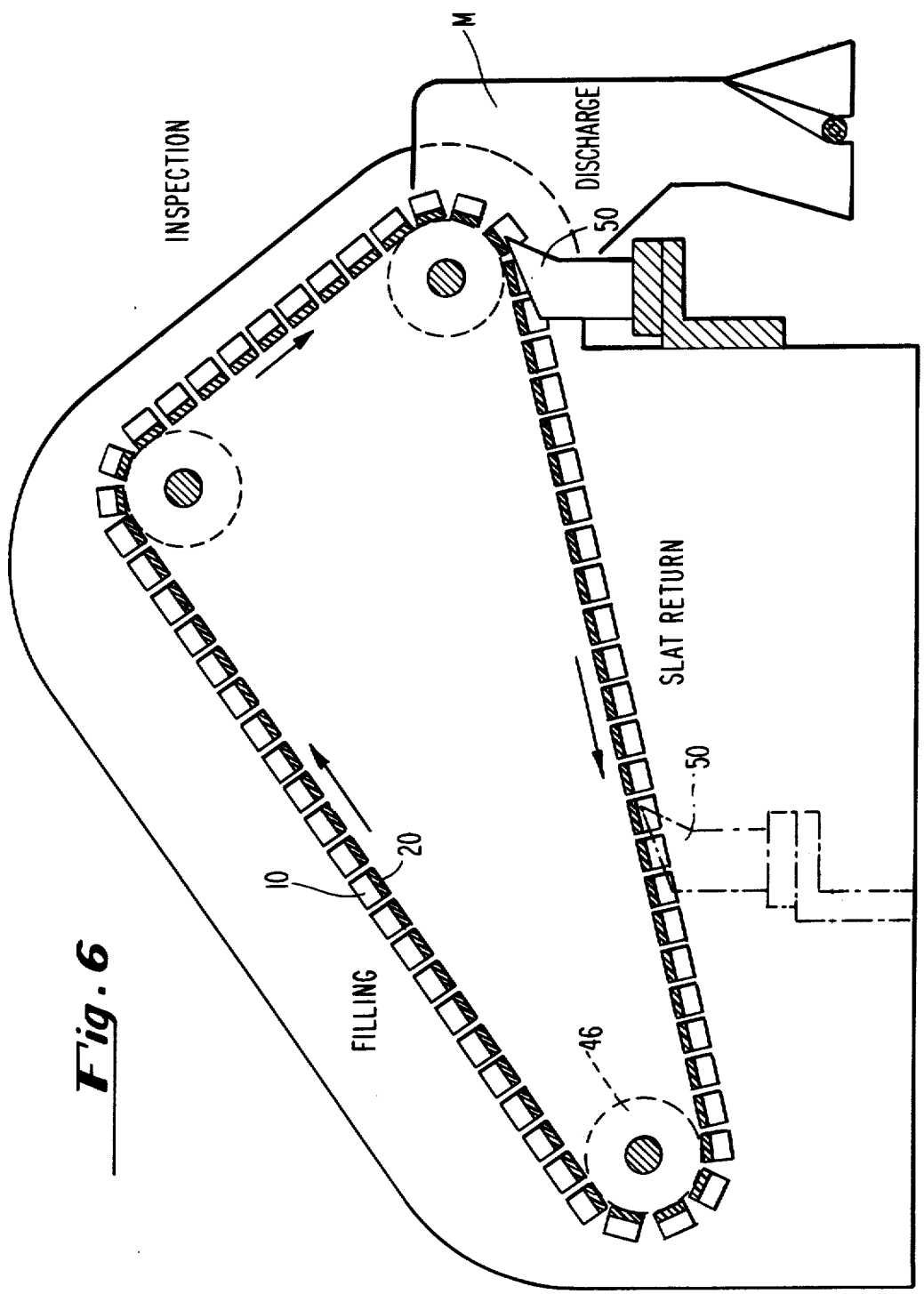
FIG. 6 is a diagrammatic illustration of a typical path of travel of the slat members, and alternate locations of the ejector mechanism of the present invention.

The article filling station area, inspection area, discharge station area, and slat return area, are designated in FIG. 6. Slats 10 move in a generally clockwise direction in a closed loop path by means of chains 28 abovementioned which are driven by sprockets 46, controlled by a suitable motor (not shown).

The ejector mechanism of the present invention includes a plurality of spaced stationary blades 50, preferably angled as shown, which register with the moving slat cavity slits 42 to thereby eject any articles wedged in cavities 12 into manifold M for counting; or into a container placed beneath the slat return area when the ejector blades 50, illustrated by dotted lines, are mounted at the slat return area. It will be appreciated that the blade ejectors will not be mounted for simultaneous operation at both discharge and slat return areas.

Figure 7:
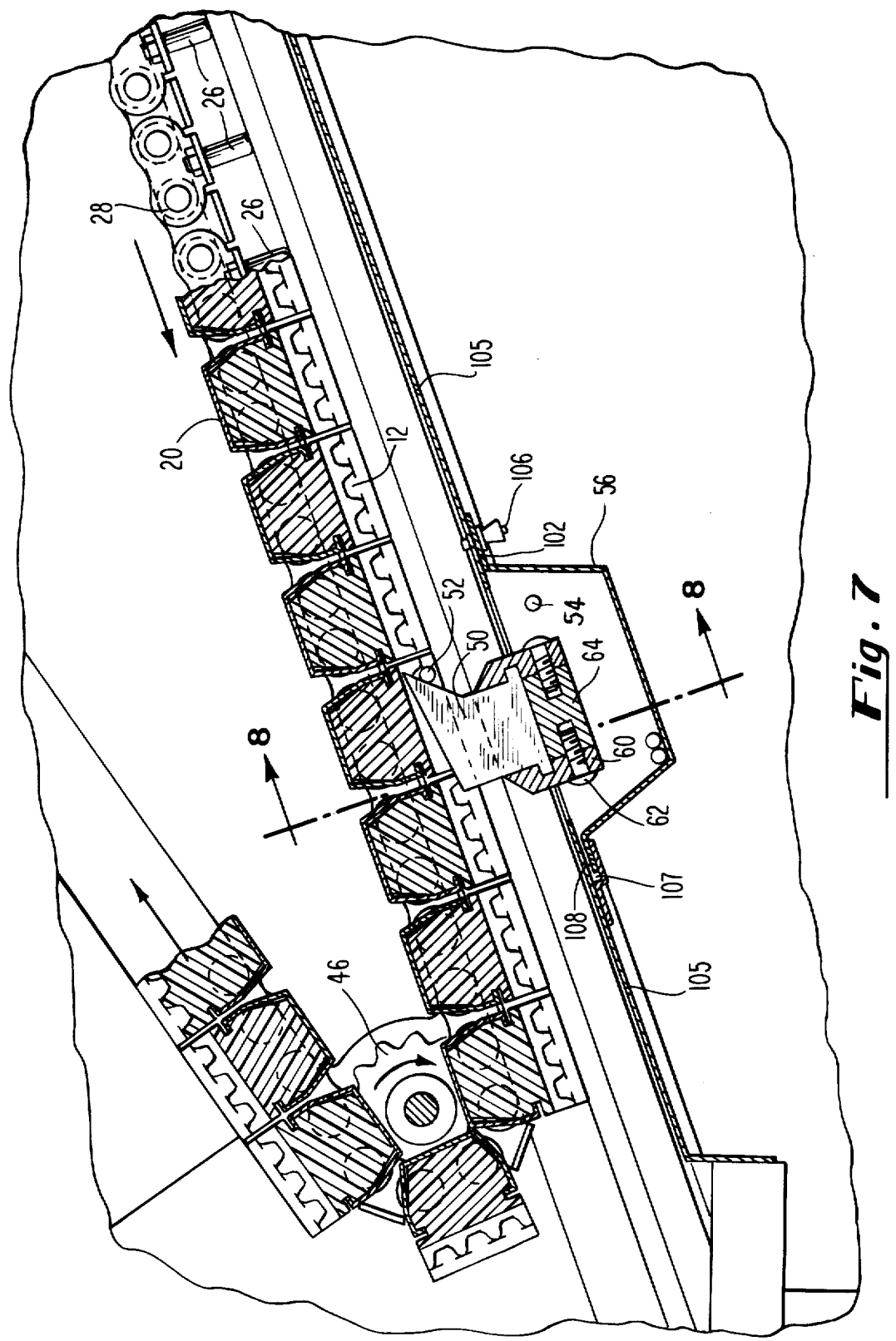
FIG. 7 is a fragmentary sectional view, in greater detail, of a portion of the mechanism of FIG. 6.

Referring now to FIG. 7, the ejector blades are shown mounted at a slat return area. An ejector blade 50 is depicted in the process of unwedging or dislodging a capsule 52 from a cavity. Another previously stuck capsule 54 has already been ejected from its cavity and is shown dropping into a pan 56.

A pair of elongated blade retaining members 60 rigidly secures blades 50 therebetween by means of screws 62 and an elongate blade holder support member 64.

In order that stationary ejector blades 50 register precisely with moving slits 42, it is essential that the slats and blades be aligned with respect to each other. Structure permitting this alignment is shown in FIGS. 8 and 9. It will be appreciated that such structure is mounted to left chain guide 70 by means of bracket members (not shown) which, in turn, are screw mounted interiorly to the left side plate (also not shown) which, along with right side plate 32, form a partial housing for the slat transport system.

Thus, a beveled contactor strip 72, conveniently of nylon, polytetrafluoroethylene, or similar material, is provided with a sufficient length to make contact with the widths of several successive end portions 22 of slats 10, the width of a slat or end portion 22 being the dimension across that surface of a slat in which cavities 12 are provided. The width of contactor strip 72 conveniently approximates the depth of end portion 22 or upper portion 45 of a slat member. End portions 22 are designated I, II and III (FIG. 9). Constant contact between contactor strip 72 and the three slat end portions is maintained by a pair of compression springs 74 which exert force against contactor strip holder 76, preferably metal, attached by means of screws 78 to contactor strip 72.

Springs 74 exert their force against contactor strip holder 76 through a mounting bar 80, held immovable to left chain guide 70 by screws 82, which mounting bar 80 is provided with a pair of bores 84. Similar bores 86, aligned with bores 84, are provided in contactor strip holder 76, which aligned bores receive the springs.

Spacers 87 are interposed between mounting bar 80 and left chain guide 70. Alternatively, mounting bar 80 may comprise a single C-shaped member.

A pair of guide pins 88, in the form of shoulder screws, is slidingly received by mounting bar 80 and threadedly received into contactor strip holder 76. Thus, contactor strip holder 76 and contactor strip 72 may be considered a "floating" unit capable of movement in the directions indicated by arrow 89 when contactor strip 72 is continuously contacted by slats moving therealong. The floating unit acts to resiliently urge those slats in contact therewith to the right, although not necessarily with the same degree of force. A stop member 90, secured to right chain guide 30, acts to limit the lateral movement of those slats which are urged to the right by the floating units. More specifically, that slat having end portion designated III (FIG. 9) will have its other end portion in abutting relationship to, or bearing against, stop member 90 to insure the positive positioning of that slat immediately prior to engagement with blades 50. In actual practice, stop member 90 will be of sufficient length to insure proper positioning of several slats prior to blade engagement.

Force exerted by contactor strip 72 against slat end portions may be varied by replacing springs 74 with springs of desired strengths.

Each of the two chain guides 30 and 70 supports a wear strip support member 92 which, in turn, supports a wear strip 94. End portions 22 of slats 10 are permitted to slide upon wear strip 94 during their return from the discharge area.

Each wear strip support member 92 is internally threaded to receive a screw 96. Blade holder 64 includes an extension or arm 98 at each end thereof, which arms are each provided with an aperture 99 to permit passage of a screw 96 therethrough. Shims or washers (not shown) may be placed between arms 98 and wear strip support members 92 to permit vertical adjustment of the blades.

Lateral adjustment of the blades is accomplished through horizontal adjustment screws 100. In this regard apertures 99 are sufficiently large to accommodate lateral movement of blade holder 64.

Pan 56 is supported beneath blades 50 to receive ejected capsules 54. Thus, pan 56 includes a lip 108 (FIG. 7) which engages a Z bar 107 secured to a dust cover 105. Another lip 102 on pan 56 is removably fastened to dust cover 105 with suitable pins, such as ball lock pins 106, for example. Dust cover 105 engages notches 104 provided in wear strip support members 92.

SUMMARY OF OPERATION

The operation of the present counting machine in accordance with my invention is believed apparent from the foregoing description. To summarize the operation it may be stated that bottles to be filled with a desired number of capsules, for example, are moved into receiving position by conveyor means C. The slats carrying the capsules are arranged to control electronic switch means for controlling the number of tablets to be dishcarged into the manifold system M for ultimate discharge into the bottles. Ideally, as hopper H feeds capsules into the moving slats, each cavity 12 of each slat 10 receives a single capsule. As the slats move past the inspection area to the discharge area, the capsules are controllably discharged as aforementioned. If a capsule however becomes wedged in a cavity and fails to be discharged by gravity at the discharge area, a short count will result in the bottle into which the wedged capsule should have been discharged. To prevent any continuous miscount, the blade ejector mechanism of the present invention will positively unwedge the capsule at the discharge area, or at a slat return area, depending upon the location of the blades.

The short count may be remedied when the blades are placed at the slat return area by electronic means forming no part of the present invention.

I claim:

1. In an article counting machine having a series of elongated slats, means supporting said slats for movement in a closed path in a direction transverse to direction of slat elongation, each of said slats having a multiplicity of spaced cavities provided in an outer wide surface thereof and along length of said slat, said path including cavity charging and article discharging stations and a slat return station after said discharging station, means at said charging station for depositing an article in each of said cavities, means to gradually invert the slats for discharging said deposited articles for counting at said discharging station, the improvement therewith comprising a slit provided through each of said cavities, said slits having a depth slightly greater than depth of said cavities, said slits aligned with the direction of travel of said slats, stationary ejector means mounted to said counting machine for operably engaging said slits while said cavities are disposed in a discharging attitude, a mounting bar fixedly mounted to a side support plate of said machine, a contactor member, spring means communicating between said mounting bar and contactor member urging said contactor member away from said mounting bar and against end portions of successive slats as said successive slats travel in said closed path movement to urge said successive slats laterally away from said mounting bar, guide means cooperating between said mounting bar and contactor member for guiding floating movement of said contactor member when said slats are urged laterally away from said mounting bar, means mounted to opposing side plate of said machine for limiting lateral movement of said successive slats by said contactor member whereby said successive slats are positively positioned for registration of said ejector means with said slits to a depth deeper than bottom of said cavities such that articles wedged in said cavities failing to discharge by force of gravity at said discharging station are ejected from said cavities to prevent a continuous miscount of said articles.

2. The machine of claim 1 further characterized by said ejector means being mounted at said discharging station whereby said wedged articles failing to discharge at said discharging station by gravity are ejected from said slit cavities by said ejector means at said discharging station for counting of said ejected articles.

3. The machine of claim 1 further characterized by said ejector means being mounted at said slat return station whereby said wedged articles failing to discharge at said discharging station by gravity are ejected from said slit cavities by said ejector means into an isolated container to thus prevent a continuous miscount of said articles, said wedged articles including malformed and partially formed articles.

4. The machine of claim 1 wherein said ejector means comprises a plurality of spaced angled blades.

5. The machine of claim 1 wherein said outer wide surface defines an upper portion of said slats, said upper portion having a depth substantially greater than depth of said cavities, said slits penetrating partially into depth of said upper portions, said ejector means having tips at ends thereof such that closed path movement of said slats causes said tips of said ejector means to ride within said slits and into deepest portion thereof.

6. The machine of claim 4 further characterized by
an elongate blade retaining member provided on each side of a lower portion of said plurality of spaced blades,
an elongate blade holder support member disposed below said blades and between said blade retaining members, and
means for securing said blade retaining members against said blades.

7. The machine of claim 6 further characterized by said means supporting said slats for movement in a closed path including a pair of endless chains operably connected to motor driven sprockets, each of said pair of chains being supported and guided by a chain guide mounted to each of said side support plates of said machine,
a wear strip support member secured to each of said chain guides,
a wear strip supported by each of said wear strip support members, said wear strip providing a surface upon which end portions of said slats slide during movement thereof at said slat return station,
a lateral extension provided at each end of said elongate blade holder support member,
means operative between each of said lateral extensions with a wear strip support member in close proximity thereto for providing vertical adjustment means to said blades, and
other means operative between each of said lateral extensions with one of said chain guides for providing lateral adjustment means to said blades.

* * * * *